Oct. 9, 1951     V. W. RYCHWALSKI     2,570,988
STEERING WHEEL BRAKE

Filed Sept 27, 1948     2 Sheets-Sheet 1

Inventor

Vernon W. Rychwalski

By Clarence A. O'Brien
and Harvey B. Jacobson
Attorneys

Oct. 9, 1951  V. W. RYCHWALSKI  2,570,988
STEERING WHEEL BRAKE
Filed Sept. 27, 1948  2 Sheets-Sheet 2
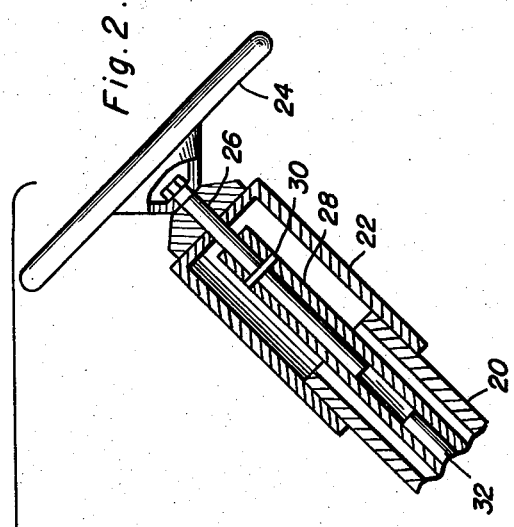
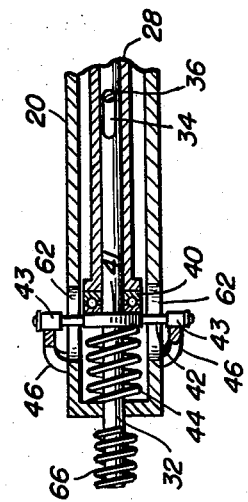
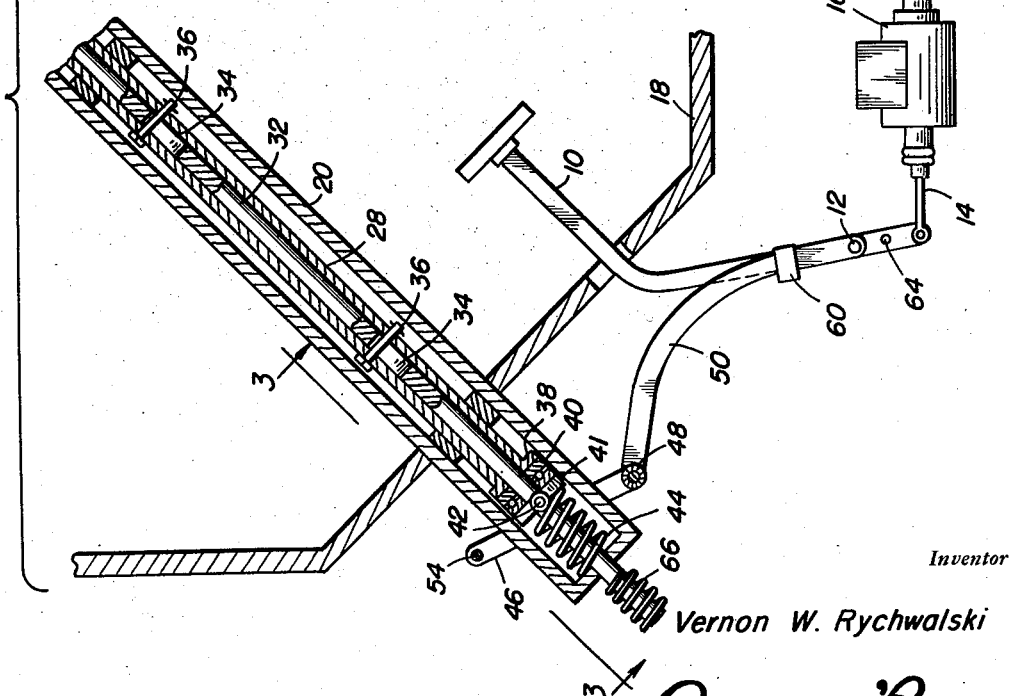
Inventor
Vernon W. Rychwalski
By Clarence A. O'Brien
and Harvey B. Jacobson
Attorneys Patented Oct. 9, 1951

2,570,988

UNITED STATES PATENT OFFICE 2,570,988

STEERING WHEEL BRAKE

Vernon W. Rychwalski, Rochester, N. Y., assignor of fifty per cent to W. Thomas Barrett, Rochester, N. Y.

Application September 27, 1948, Serial No. 51,436

4 Claims. (Cl. 74—481)

This invention relates generally to motor vehicles and more particularly to the combination with the standard portion of the motor vehicle of a steering column in two longitudinally spaced parts, the upper part having the steering wheel secured thereon, a sleeve connecting the lower part of the steering column for rotation with the upper part and allowing relative longitudinal movement between the upper and lower parts, and means operatively connecting the lower part with a standard brake pedal, whereby depression of the steering wheel will cause application of the brakes in the motor vehicle, independently of the operation of the foot pedal.

A primary object of this invention is to provide a brake controlling system for a motor vehicle in which the brakes may be applied by the manipulation of the steering wheel, without interfering with the normal functioning of the steering wheel in guiding the vehicle.

Another object of this invention is to provide a device of the character mentioned above which will allow the foot pedal to be used to apply the brake without actuation of the steering wheel.

Still another object of this invention is to provide a steering wheel brake system in which a minimum number of parts are added to the conventional motor vehicle.

Still another object of this invention is to provide a braking assembly for a motor car such as will be ideally suited for the use of persons having limited use of their legs, or for use under conditions when it is inconvenient or impossible for the driver of the motor vehicle to operate the brakes by a conventional foot pedal.

Yet another object of this invention is concerned with the fact that human reflex action appears to be definitely more quickly translated into movement of the arms than to movement of the feet, a consideration which is definitely linked with the safety of operation of motor vehicles.

And a last object to be mentioned specifically is to provide a steering wheel operated brake system which is relatively inexpensive and practicable to manufacture, which is safe, simple and convenient to operate, and which will give generally efficient and durable service.

With these objects definitely in view, this invention resides in certain novel features of construction, combination and arrangement of elements and portions that will be hereinafter described in detail in the specification, particularly pointed out in the appended claims, and illustrated in the accompanying drawings which form a material part of this application, and in which:

Figure 2 is a grouped view of the structure shown in Figure 1, the view being a vertical sectional view, with certain parts shown in elevation to add to the clarity of illustration;

Figure 3 is a fragmentary vertical sectional view, taken substantially upon the line 3—3 in Figure 2;

Similar characters of reference designate similar or identical elements and portions throughout the specification and throughout the several views in the drawings.

Figure 1:
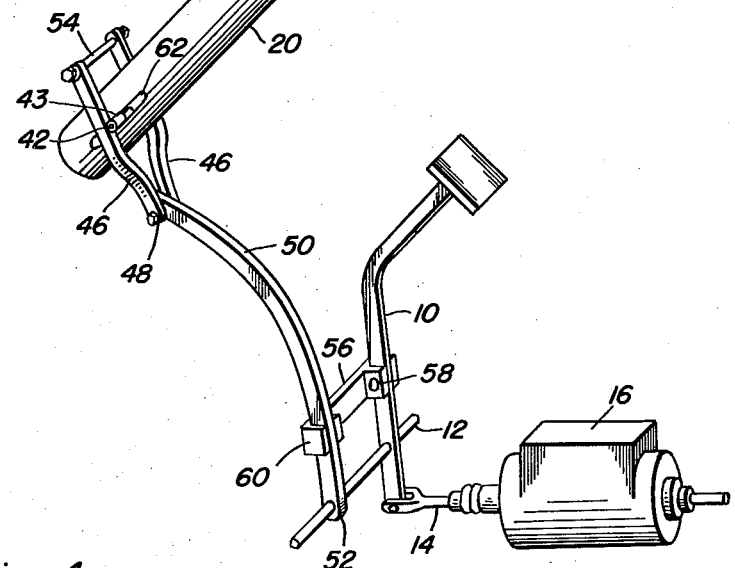
Figure 1 is a three dimensional view of this invention operatively applied to certain elements of a motor vehicle.
Figure 4:
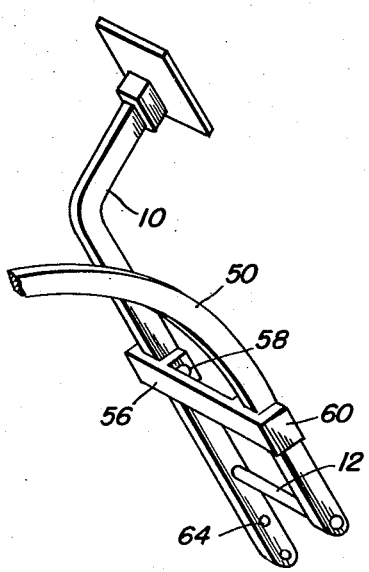
Figure 4 is a three dimensional view of a brake pedal with the contiguous portion of this invention operatively applied thereto.

Referring now to the drawings in detail, this invention is adapted to be used with an environment which will ordinarily include a brake pedal 10 pivoted on an axis member 12 fixed to the chassis of the vehicle, and operatively connected with a plunger operating member 14 associated with the master cylinder 16 of the brake system, when this system is of the hydraulic type. The environment will also include the floor board and dash board structure indicated at 18.

A steering column outer casing 20 will be provided in two parts, the upper part 22 being slidably associated with the upper end of the main portion of the casing, and the steering wheel 24 will be rigidly secured to this upper part 22 of the casing and to the upper part 26 of the steering column.

A sleeve 28 extends throughout the major portion of the length of the casing 20 and is rigidly secured to the upper portion 26 of the steering column by means of a pin 30, best represented in Figure 2. The lower part 32 of the steering column is provided with a pair of longitudinally extending slots 34 and a pair of pins 36 are secured to the sleeve 28 and extend through these slots 34 so that the sleeve will turn with the lower part of the steering column, while allowing the sleeve to move longitudinally relative to the lower part 32 of the steering column.

The lower end of the sleeve 28 has an enlargement 38 adapted to engage a bearing 40 including a disk-like portion 41 which carries a transverse bar 42. This bar is equipped with rollers 43 and a spring 44 is compressed between the lower end of the casing 20 and the lower face of the member 41 to bias the member 41 and all those parts connected thereto and to the sleeve 28 in one direction, that is, upwardly and longitudinally of the casing 20.

Figure 5:
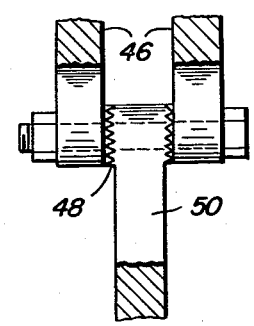
Figure 5 is a fragmentary detail view showing how the parts hereinafter referred to as the yoke and the lever connected with the foot pedal are adjustably connected.

A yoke comprised of two portions 46 of strap-like form is adjustably mounted, as indicated clearly at 48, in Figure 5, upon one end of the lever 50, this lever 50 being pivoted as indicated at 52 upon the axis member 12 already referred to above. The strap-like members 46 are joined at the tops thereof by a bar 54 to improve the rigidity thereof.

A bracket 56 is rigidly secured as indicated at 58 on the brake pedal 10 and one end 60 of the bracket 56 is adapted to engage an intermediate portion of the lever 50, so that the lever will be forced to move with the brake lever 10 when the latter is retracted but will be free to remain stationary when the brake lever 10 is depressed by foot.

The casing 20 is longitudinally slotted at each side thereof, as indicated at 62, and the transverse bar extends through these slots 62, whereby the bar is prevented from rotating with the sleeve 28, while remaining free to move longitudinally of the casing 20. It will be understood that the brake pedal 10 is biased by a spring which will be ordinarily secured at one end in the aperture 64 in the brake pedal and adapted to bias the brake pedal in one direction. The lower part of the steering column 32 will be provided with a conventional worm 66.

The operation of this invention will be clearly understood from a consideration of the foregoing description of the mechanical details thereof, taken in connection with the drawings and the above recited objects. Further description would, therefore, appear to be unnecessary.

Minor variations from the described embodiment may be resorted to without departure from the spirit of this invention and the scope of this invention should be determined only by the terms used in the appended claims.

Having described the invention, what is claimed as new is:

1. In combination with a brake pedal, steering column casing and steering wheel of a motor vehicle, of a steering column in two longitudinally spaced parts, the upper part having the steering wheel secured thereon, a sleeve connecting the lower part of the steering column for rotation with the upper part and allowing relative longitudinal movement between the upper and lower parts, and means operatively connecting the upper part with said brake pedal comprising a bracket carried by said brake pedal, a lever mounted to pivot with said pedal and frictionally associated with said sleeve, and means to bias said sleeve for longitudinal movement in one direction relative to said lower part of the steering column.

2. In combination with a brake pedal, steering column casing and steering wheel of a motor vehicle, of a steering column in two longitudinally spaced parts, the upper part having the steering wheel secured thereon, a sleeve connecting the lower part of the steering column for rotation with the upper part and allowing relative longitudinal movement between the upper and lower parts, and means operatively connecting the upper part with said brake pedal comprising a bracket carried by said brake pedal, a lever mounted to pivot with said pedal and frictionally associated with said sleeve, means to bias said sleeve for longitudinal movement in one direction relative to said lower part of the steering column, a transverse bar carried by said sleeve, and a yoke on one end of the lever to engage said bar.

3. The combination set forth in claim 2 and wherein said bar is freely rotatably mounted on said sleeve, and said yoke is adjustably mounted on said lever.

4. A combination according to claim 2 and wherein said steering column casing has longitudinal slots, said bar extending through said slots and being thereby prevented from rotation, and a bearing on said sleeve to carry said bar longitudinally with the sleeve.

VERNON W. RYCHWALSKI.

REFERENCES CITED

The following references are of record in the file of this patent:

UNITED STATES PATENTS

| Number | Name | Date |
| --- | --- | --- |
| 775,991 | Schmidt | Nov. 29, 1904 |
| 1,537,477 | Lenesque | May 12, 1925 |
| 1,791,001 | Rosmussen | Feb. 3, 1931 |
| 1,841,294 | Nicholson | Jan. 12, 1932 |
| 2,197,671 | Vergara | Apr. 16, 1940 |

FOREIGN PATENTS

| Number | Country | Date |
| --- | --- | --- |
| 494,902 | Great Britain | Nov. 1, 1938 |
| 619,673 | France | Jan. 5, 1927 |